Feb. 22, 1966  F. D. WERNER  3,236,093
INSTRUMENT PROTECTOR
Filed Oct. 24, 1963  3 Sheets-Sheet 1

INVENTOR.
FRANK D. WERNER
BY
Dugger, Bradford, Johnson & Westman
ATTORNEYS

Feb. 22, 1966　　　　F. D. WERNER　　　　3,236,093
INSTRUMENT PROTECTOR

Filed Oct. 24, 1963　　　　　　　　　　　　3 Sheets-Sheet 2

INVENTOR.
FRANK D. WERNER
BY
Dugger, Braddock, Johnson & Westman
ATTORNEYS

INVENTOR.
FRANK D. WERNER
BY
Dugger, Braddock, Johnson & Westman
ATTORNEYS

United States Patent Office 3,236,093
Patented Feb. 22, 1966

3,236,093
INSTRUMENT PROTECTOR
Frank D. Werner, Minneapolis, Minn., assignor to Rosemount Engineering Company, Minneapolis, Minn., a corporation of Minnesota
Filed Oct. 24, 1963, Ser. No. 318,699
9 Claims. (Cl. 73—431)

The present invention has relation to an instrument protector which will shield instruments in an air stream from direct impingement by foreign particles carried by the air stream in which the instrument must operate.

Delicate instruments utilized on high speed aircraft are presently subject to much damage when the aircraft flys through hail or from other airborne particles. The instruments usually have external parts, for example ice detectors, total temperature sensors and pitot-static tubes. In the case of total temperature sensors and pitot-static tubes it has been found practical to make them rugged enough to make them successfully withstand impingement of hail without any damage. Ice detectors, on the other hand, are usually more fragile since it is desirable that they be fast in response and thus they are kept to a rather small size. At the present time there is no satisfactory means for protecting this type of device from direct impingement of hail or other sizable foreign objects, such as gravel which may be blown up from a runway.

The protector of the present invention utilizes a member which will deflect and separate the foreign particles from the flow of air. The ice detector is positioned downstream from the protecting member so that the particles do not directly strike the detector. The larger particles in the air, such as hail, will strike the protector and will be deflected out of the way of the ice detector. Particles which do not strike the protector will pass harmlessly by the detector. The smaller water droplets will follow into the wake of the protector and will strike the ice detector in a normal manner.

In a second form of the invention a device is utilized which will cause the flow of air to turn from its normal flow direction to move past the ice detector. Hail particles, because of their mass, will not turn but will fly in a substantially straight path past the detector and will not strike it. The smaller particles of moisture such as super-cooled droplets of water will be carried by the air and will strike the detector so that the detector will function in its normal manner.

It is an object of the present invention to present a protector for instrumentation of moving aircraft to shield the instrument from heavy airborne particles.

It is a further object of the invention to present a protector for ice detectors which is rugged and simple to make.

It is still a further object of the present invention to present an ice detector protector which will permit the ice detector to function in its normal manner and will shield the detector from large particles of hail or gravel.

It is another object of the present invention to present an ice detector protector which has means thereon for removing ice from the surface thereof.

Other and further objects of this invention are inherent in the specification and claims which follow. The specification presents an illustrative embodiment of this invention and it is to be understood that the invention is not limited to the specific embodiments shown.

Figure 1:
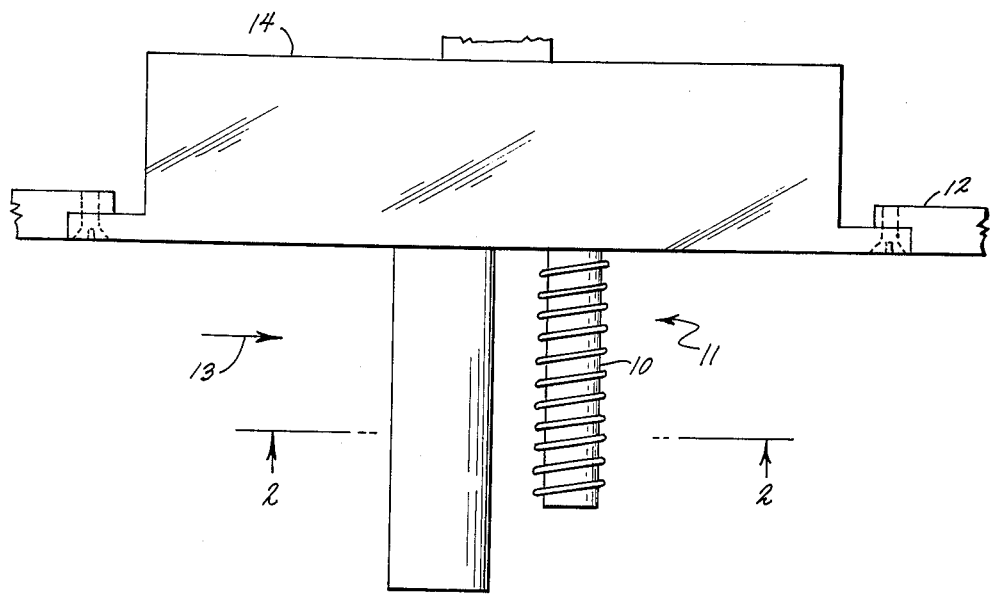
FIG. 1 is a plan view of an instrument protector made according to a first form of the present invention shown in position to protect an ice detector probe.
Figure 2:
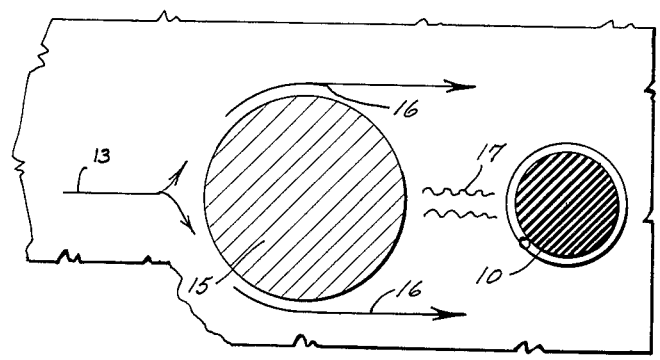
FIG. 2 is a sectional view taken as on line 2—2 in FIG. 1.

Referring to the drawings and the numerals of reference thereon, a probe 10 of an ice detector 11 projects through the skin 12 of an aircraft, or through the panel of a duct, into an air flow, which is moving in direction as indicated by arrow 13. A control box 14 is utilized for housing the electrical controls for the ice detector.

The control box 14 also mounts a protector or guard member 15 which is mounted on the upstream side of the probe 10. The member 15 is positioned in relation to the air flow so that the air stream flows around the member as shown by arrows 16. The probe 10 is located in the wake 17 behind the protector member.

Any large particles, such as hail, gravel or other solid objects in the air stream will strike the protector member 15 and follow the air stream as illustrated by arrows 16. The wake 17 represents turbulent flow and the smaller droplets of water in the air stream will start to mix into the turbulent flow a short distance behind the guard or protector member. The probe 10 will be located some distance from the guard or ice protector. Thus the concentration of small water droplets in the wake 17 behind the probe 10 will be representative and very little error will result in the detection of icing conditions. In this specification, large particles are defined as hail, gravel and other solid objects which will normally damage ice detector probes, and as differentiated from water droplets.

The protector member 15 in this form of the invention, must be heated to prevent ice build up on the forward surfaces thereof. Therefore the air on the downstream side of the protector will be somewhat warmer than the ambient temperature but the effect will be negligible if the probe 10 is sufficiently far downstream.

Figure 3:
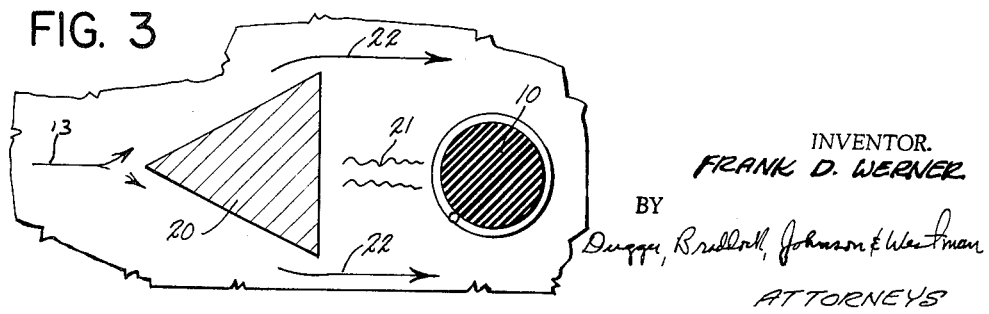
FIG. 3 is a sectional view taken substantially on the same lines as FIG. 2 showing a modified form of an instrument protector.

In FIGURE 3 a guard or protector member 20, which is of triangular cross section is utilized. A probe 10 is also positioned in the wake 21 of this protector and the air stream will flow past the protector member 20 as shown by arrows 22.

The same effect will be present with the guard or protector member 20 as with the protector 15. The probe 10 will be spaced downstream from the guard 20 a sufficient distance so that the water droplets in the air stream will have a chance to mix into the turbulent wake and strike the probe of the ice detector. The heavy particles of hail which will damage the probe will not mix with the wake as readily as the lighter water droplets. The guard member 20 will also be heated to prevent ice from building up thereon.

It is apparent that the guard, in this form of the invention, can be of any cross-sectional shape or design including a streamlined guard, wherein the wake would be very small or almost absent. The guard will deflect the large particles in the air stream and prevent them from striking the probe of the ice detector.

Figure 4:
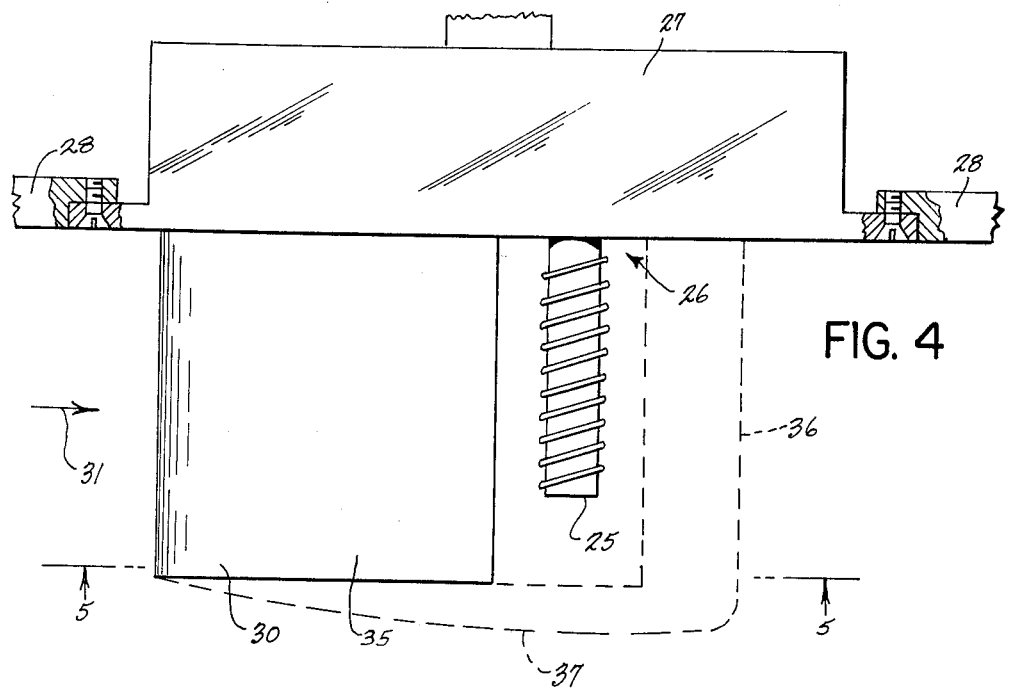
FIG. 4 is a plan view of an instrument protector made according to a second form of the present invention.
Figure 5:
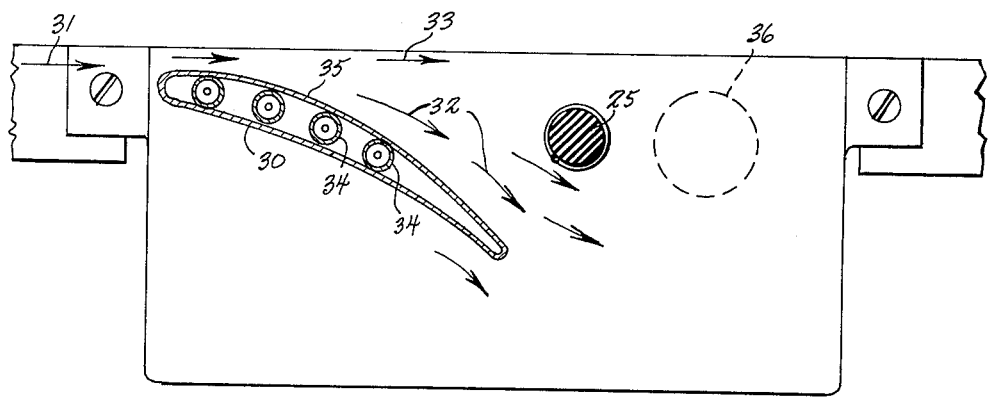
FIG. 5 is a sectional view taken as on line 5—5 in FIG. 4.

Referring to FIGS. 4 and 5 a second form of the present invention is shown. In this form of the invention a probe 25 from an ice detector illustrated generally at 26 is mounted onto a control box 27 which in turn is mounted to the skin 28 of an airplane or the panel of a duct. The control box 27 also supports a protector or guard member 30 which projects into an air stream moving as indicated by arrows 31. The protector member is on the upstream side of the probe 25 so that the air flow strikes the protector member before it strikes the probe. As shown in FIG. 4 the guard member 30 has an air foil cross-sectional shape. The chord line of the air foil is positioned at an oblique angle with respect to the direction of air flow, which causces the air stream indicated by arrows 31 to turn in direction as indicated by arrows 32. The air stream will follow surface 35 of the guard member which is on the upper downstream side thereof. Large particles of hail or other foreign objects will, because of their mass, continue to move in direction as indicated by arrows 33 and will fly past the probe 25. The water droplets suspended in the air stream are lighter and will follow the air stream in direction as indicated by arrows 32 past the ice detector probe 25 so that the presence of these water droplets can be detected.

The guard member 30 has heating elements 34 therein which can be energized to prevent the guard member from icing up. This will cause heating of the boundary layer of air on the upper, downstream surface 35 of the guard member. However, it will not cause significant heating of the air flowing past the probe. The heated air is moved rearwardly and downwardly away from the ice detector probe.

It can be seen the particles of hail directly in line with the probe will strike the guard member 30 and be deflected away from the probe. Air and lighter particles flowing past the ice detector guard member 30 will curve and follow along the upper surface 35 thereof and engage the probe. The presence of water in this air flow will be detected by the probe.

An auxiliary guard 36, which is illustrated in dotted lines, can be mounted behind the probe 25 of the ice detector. The auxiliary guard 36 may have a mounting member 37 extending forwardly and joining guard 30. Auxiliary guard 36 can be of any desired cross-sectional shape and is utilized for aiding in turning the air flow to go past the probe 25 of the ice detector. The auxiliary guard 36 will also be heated to prevent ice build up thereon.

Figure 6:
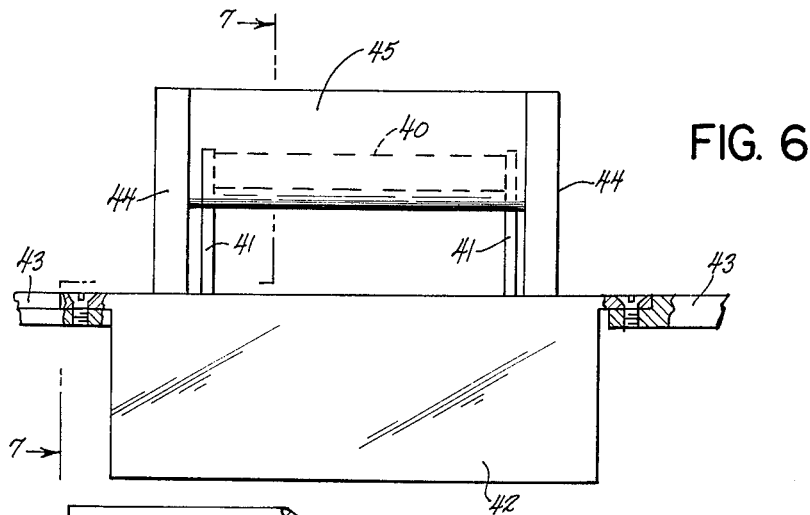
FIG. 6 is a front elevational view of an instrument protector made according to a third form of the present invention.
Figure 7:
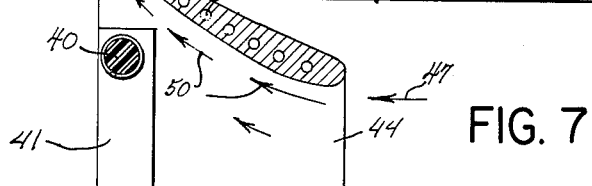
FIG. 7 is a sectional view taken as on line 7—7 in FIG. 6.

In FIGS. 6 and 7 there is shown an alternate mounting for an ice detector protector made according to the present invention. In FIG. 6 it can be seen that an ice detector probe 40 is mounted onto a pair of spaced upright supports 41, 41 which in turn are mounted to a control box 42. The control box is mounted onto the skin 43 of an airplane, as in the previous forms of the invention. A second pair of upright supports 44, 44, which are substantially parallel and spaced apart, are used to mount a guard or protector member 45. The supports 44, 44 are spaced apart farther than the supports 41, 41. The guard 45 is shaped like an air foil, as was the guard 30 in the previous form of the invention, and has heating elements 46 operable to prevent ice build-up. The air flow is in direction as indicated by arrow 47 in FIG. 7. The chord line of this guard is also positioned at an oblique angle with respect to the direction of air flow. The air will follow along the upper or downstream facing surface of the guard in direction as indicated by arrows 50, past the ice detector probe 40.

Large particles in the air stream again will be deflected so that they will not impinge upon the probe 40, as in previous forms of the invention.

The use of separate supports for the probe and the protector minimizes any effect of heat transfer from the guard to the probe occasioned by the use of a common support. In other words, the guard or protector 45 is heated and the heat from this guard should not reach the ice detector probe 40 inasmuch as this can cause erroneous readings. By utilizing two separate supports this heating error is minimized. The boundary layer of heated air along the guard 45 will not be transferred to the ice detector protector because the air flow along the guard will insure that any heat will be moved downwardly and rearwardly away from the probe 40.

Figure 8:
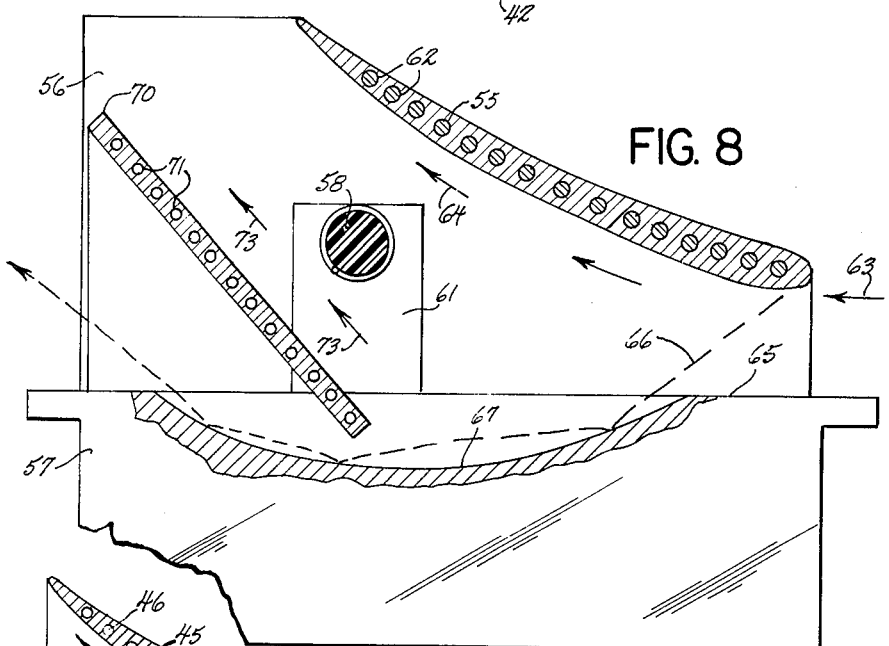
FIG. 8 is a sectional view taken as on substantially the same line as FIG. 7 showing a modified form of the device of FIG. 6.

In FIG. 8 a further modified form of the invention is illustrated. In this figure the construction is substantially the same as that in FIG. 7. An air foil shaped guard 55 is mounted onto supports 56 at opposite ends thereof and is spaced above a control box 57 for an ice detector assembly, which includes a probe 58 mounted onto supports 61 in substantially the same manner as shown in FIGS. 6 and 7. The chord line of guard 55 is at an oblique angle with respect to the direction of air flow. The guard 55 also includes heater elements 62 to prevent ice from building up on the guard. The air flow is in direction as indicated by arrow 63 in FIG. 8 and the air will flow around the air foil, as shown by arrow 64. Thus the air and lighter particles such as water droplets will come in contact with the probe 58.

In order to prevent particles from striking the edge of the guard 55, ricocheting against the flat surface 65 of the control box and striking the probe 58, the surface 67 of the control box 57 is of a concave configuration which may either be lenticular as shown or made into a series of connected flat surfaces. The surfaces are positioned so that any particle striking the leading edge of the guard 55 will follow the ricochet path illustrated by dotted lines 66. The contoured surface 67 is designed so that no matter where a particle of hail or gravel strikes this surface, it will ricochet away from the probe 58.

In order to further enhance the air flow characteristics around the guard 55, an auxiliary plate 70 is mounted onto supports 56, 56. The auxiliary plate has heaters 71 which prevent ice from building up on the surface thereof. The plate 70 is mounted so that it is spaced above the contoured surface 67 to permit the particles to pass along the surface 67 in their ricochet path. The plate 70 will deflect air flowing between the leading edge of the guard 55 (which is adjacent surface 65) and the surface 65 and will cause the air to flow in direction as indicated by arrow 73. A plate 70 is positioned at a suitable angle to prevent particles from striking this plate and ricocheting against the probe also. The plate 70 increases the air flow past the probe 58 so that a true measurement of icing conditions, particularly when the rates of icing are very low, is made.

What is claimed is:

1. A protector for a probe of an instrument on an aircraft, said probe extending outwardly from a portion of the skin of the aircraft and positioned to be struck by the air stream, said protector including a guard member having a cross-sectional shape like an air foil and a chordal axis, said guard member mounted on the aircraft in position to intercept large particles moving parallel to the air stream and prevent said large particles from striking said probe, the chordal axis of said guard being at an oblique angle with respect to the direction of said air stream, said guard further being positioned so that induced airflow along the surface thereof which faces in downstream direction strikes said probe, and heating means on said guard to maintain the temperature thereof above freezing.

2. The combination as specified in claim 1 and an auxiliary plate mounted to the aircraft spaced downstream from said probe, said guard and said plate cooperating to form a channel having its longitudinal axis oblique to the air stream through which air may flow to strike said ice detector probe.

3. The combination with an instrument used in an air stream, said instrument having a member protruding into said air stream, of:

a guard member positioned on the upstream side of said instrument and being of size to shield said instrument member from impingement of large particles in said air stream, a main panel, said guard member being mounted with respect to said main panel and being spaced from and the longitudinal axis thereof being parallel to the panel, the portion of said panel immediately downstream from the leading edge of said guard having a concave surface positioned to prevent large particles in said air stream from striking said guard and ricocheting against said panel to strike the instrument member.

4. The combination with an instrument used in an air stream, said instrument having a probe portion protruding into said air stream, of:

a guard member positioned on the upstream side of said instrument and being of size to shield said instrument probe portion form impingement of large particles in said air stream, said guard member having a cross-sectional shape like an air foil and being positioned with the chord line thereof at an oblique angle with respect to the direction of air flow to divert the air stream from its normal path past said probe portion.

5. The combination with an instrument mounted onto a panel along which air must flow and having a probe positioned to intercept an air stream flowing along said panel, of:

a protector for said probe comprising an elongated member having a cross-sectional shape similar to an air foil, said elongated member being positioned on the upstream side of said probe and in position to intercept large particles carried by said air stream, said protector further being positioned to prevent large particles moving parallel to the air stream from striking said probe and to alter the direction of flow of said air stream on the downstream side of said protector so as to move past said probe, and an auxiliary member mounted on said panel and positioned on the downstream side of said elongated member, said elongated member and said auxiliary member cooperating to form a channel having a longituinal axis which is oblique to the air stream and through which air may flow and come into contact with said probe.

6. The combination as specified in claim 5 wherein said air foil shaped guard is heated.

7. The combination with an ice detector mounted onto a panel along which air flows and having a probe positioned in an air stream flowing along said panel, of:

a protector for said probe comprising an elongated member having a cross-sectional shape similar to an air foil, said member being mounted on the upstream side of said probe and in position be impinged by large particles carried by said air stream, said protector further being positioned to prevent large particles moving parallel to said air stream from striking said probe and to alter the direction of flow of said air stream on the downstream side of said protector so as to move past said probe, a chord line of said air foil shaped member extending in an oblique angle with respect to the direction of flow of said air stream, and the longitudinal axis of said air foil shaped member being parallel to the panel on which it is mounted, the portion of said panel immediately behind the leading edge of said air foil shaped member having a concave surface positioned to prevent large particles in said air stream from striking said guard and ricocheting against said panel to strike the probe.

8. The combination with an instrument mounted onto a panel along which air must flow and having a probe positioned to intercept an air stream flowing along said panel, of:

a protector for said probe comprising an elongated member having a cross-sectional shape similar to an air foil, said member being mounted on the upstream side of said probe and in position to be impinged by large particles carried by said air stream, said protector further being positioned to prevent large particles moving parallel to said air stream from striking said probe and to alter the direction of flow of said air stream on the downstream side of said protector so as to move past said probe, said member and said probe being mounted with separate support means and the longitudinal axes of said member and said probe being substantially parallel to each other and to the surface, and an auxiliary plate mounted to the support means for the member and spaced downstream from said probe, said member and said plate cooperating to form a channel having a longitudinal axis oblique to the air stream through which air may flow to strike said probe.

9. The combination as specified in claim 8 wherein said panel comprises a portion of the skin of an aircraft.

References Cited by the Examiner

UNITED STATES PATENTS

| | | | |
|---|---|---|---|
| 2,343,281 | 3/1944 | Crane | 73—182 X |
| 2,914,755 | 11/1959 | Fraser | 340—234 |
| 3,057,198 | 10/1962 | Crouchman | 340—234 X |

FOREIGN PATENTS 823,684  11/1959  Great Britain.

RICHARD C. QUEISSER, *Primary Examiner.*

DAVID SCHONBERG, *Examiner.*